United States Patent [19]

Zemelman et al.

[11] Patent Number: 5,028,442

[45] Date of Patent: Jul. 2, 1991

[54] METHOD OF COATING FRIED BAKERY PRODUCTS

[75] Inventors: Valery Zemelman, Wilton, Conn.; Charles Mason, Yonkers, N.Y.; Barry N. Frake, Northport, N.Y.; Frank P. Shipman, Islip, N.Y.

[73] Assignee: Kraft General Foods, Inc., Glenview, Ill.

[21] Appl. No.: 419,978

[22] Filed: Oct. 11, 1989

Related U.S. Application Data

[63] Continuation of Ser. No. 190,314, May 4, 1988.

[51] Int. Cl.$^5$ .............................................. A21D 15/00
[52] U.S. Cl. ...................................... 426/303; 426/94; 426/99; 426/302; 426/306; 426/549; 426/572; 426/602
[58] Field of Search ................... 426/94, 99, 302, 303, 426/306, 307, 549, 572, 601, 602, 613

[56] References Cited

U.S. PATENT DOCUMENTS

| | | | |
|---|---|---|---|
| 3,031,309 | 4/1962 | Bogner et al. | 426/94 |
| 3,223,532 | 12/1965 | Pinkalla et al. | 99/123 |
| 3,667,963 | 6/1972 | Kalter et al. | 426/94 |
| 3,784,713 | 1/1974 | Colten et al. | 426/306 |
| 3,784,714 | 1/1974 | McReynolds | 426/306 |
| 3,895,105 | 7/1975 | Colten et al. | 426/306 |
| 4,293,572 | 10/1981 | Silva et al. | 426/303 |
| 4,390,553 | 6/1983 | Rubenstein et al. | 426/94 |
| 4,603,051 | 7/1986 | Rubenstein et al. | 426/307 |
| 4,721,622 | 1/1988 | Kingham et al. | 426/94 |
| 4,762,721 | 8/1988 | Holscher et al. | 426/303 |

Primary Examiner—Donald E. Czaja
Assistant Examiner—Mary S. Mims

[57] ABSTRACT

A unique coating composition is described for coating a fried bakery product such as a donut to control moisture migration from coated bakery products especially chocolate coated donuts which remain soft in texture and of stable quality over extended periods of time.

16 Claims, No Drawings

METHOD OF COATING FRIED BAKERY PRODUCTS

This is a continuation of application Ser. No. 190,314, filed May 4, 1988, abandoned.

TECHNICAL FIELD

This invention relates to unique coating compositions for coating fried bakery products to control moisture migration and to improve fried bakery products which maintain its high quality over extended periods of time.

BACKGROUND OF THE INVENTION

A series problem which has always existed in the bakery industry relates to the matter of staling as perceived by the firming of the food product due to moisture loss. This is especially true in a fried bakery product such as a donut because of its low moisture and high fat content surface and high moisture content inside the product. The moisture of the fried baked product will migrate from the high vapor pressure area (inside the product) to the low vapor pressure area (low moisture surface) until equilibrium in the vapor pressure and moisture is reached. As this process continues the inside portion of the product known as the crumb has a decrease in moisture content which contributes to the perceived staleness and hardening of the fried bakery product. Donuts contained in a storage box become firm and slightly mealy after 2 or 3 days. When a coating such as chocolate or compound is applied to a fried bakery product, these products, especially the donuts, firmed very rapidly and were less desirable for eating after 1 to 2 days. The rapid firming is due to the rapid moisture migration from the crumb of the fried bakery product to the coating of the product.

There have been many techniques suggested to overcome the moisture migration in a fried bakery product. In Silva et al., U.S. Pat. No. 4,293,572 the prior art describes many outer coating compositions unrelated to the present invention. Silva et al describes a method of coating a multicomponent baked or fried bakery food product with an edible effective moisture barrier. This coating consisted of a mixture of saccharide, polysaccharide or dextrin; water and an emulsified acetylated monoglycerides triglycerides. The coating formed on the baked products apparently was a satisfactory moisture barrier but the composition is different than the more predictable composition used in the present invention. Other satisfactory protective coating compositions include McReynolds et al., U.S. Pat. No. 3,784,714 which describes coating a bakery product with a chocolate product containing calcium stearate to retard moisture loss. Colten et al., U.S. Pat. No. 3,784,713 describes a moisture barrier coating for baked products by incorporating into a chocolate coating a minor amount of an alkali or alkaline earth metal derivative of isolated soy protein. Lang et al., U.S. Pat. No. 3,784,714 describes a glaze composition for a bakery product as a moisture barrier which comprises a dextrin component, water, chemical preservative and an edible acid. In the present invention, a unique coating composition has been discovered which controls a moisture migration for fried bakery products especially for chocolate coated donuts which remain soft in texture and of stable quality over extended periods of time.

SUMMARY OF THE INVENTION

In accordance with the present invention, a unique coating composition for a fried bakery product has been discovered which has outstanding moisture control properties and can be predictably reproduced by controlling the relative humidity of the coating by the addition of an aqueous soluble sugar-containing syrup to the remaining ingredients of the coating. The unique coating composition for a fried bakery product such as a donut, other donut products, honey bun, crullers and the like for this invention comprises:

(1) about 60 to about 95 weight percent of an edible lipid such as a fat or shortening having a melting point above about 99° F.;

(2) an amount of an aqueous soluble sugar-containing syrup and/or water added to ingredient (1) to produce a moisture content in the coating composition having a relative humidity of about 63 to about 75% as measured in a sealed air-tight box having a controlled starting headspace conditions of 70° F./60% relative humidity environment where 100 grams of said coating is spread evenly onto a surface of a pan wherein the relative humidity is recorded at five minute intervals until substantially equilibrated. A preferred coating composition for this invention is the same composition as described above except that the edible lipid, having a melting point above about 99° F. in amounts from about 65 to about 88 weight percent and an edible fibrous-containing powder is present in amounts from about 5 to about 15 weight percent. An additional aspect of this invention is an improved donut which contains a substantially uniform coating of the above described compositions and additionally to an improved donut which is coated with a cholocate coating or other suitable icings. The improved donuts of this invention remain soft in texture and of stable quality over extended periods of time.

DETAILED DESCRIPTION OF THE INVENTION

The edible lipids such as fat or shortening used in the compositions of this invention are those edible lipids such as fats or oils which include palm oil, olive oil, oleic oil, coconut oil, canola oil, palm kernel oil, soybean, corn oil, peanut oil, sunflower oil, cottonseed oil, safflower oil among others, mixtures of these oils, hydrogenated or partially hydrogenated oils. It is essential for purposes of this invention that the oils or shortenings have a melting point above 99° F. and preferably above 105° F. and more preferably 110° F. to 117° F. The fats or shortening as used herein do not require emulsifiers as long as constant agitation is maintained in the mixing. It is preferred to use emulsifiers such as mono- and diglycerides which are well known and are used in acceptable amounts as an aid in the preparation of the coating composition of this invention. The amounts of a fat or shortening used in the coatings of this invention can range from about 60 to about 95 weight percent of the total composition. The amounts of a fat or shortening used with about 5 to about 15 weight percent of an edible fibrous containing powder can range from about 65 to about 88 weight percent of the total composition.

The amount of water added to the ingredients of the coating compositions will depend on the relative humidity of the coating composition required.

The aqueous soluble sugar-containing syrup used in the coatings of this invention is dependent on relative humidity of the coating achieving above about 60 to about 75%. This means that the soluble sugar-containing syrup is mixed with the water and edible lipids such as fat or shortening to form a coating having a relative humidity above about 60% to about 75%. Amounts of the aqueous soluble sugar-containing syrups used can range from 0 to about 20 weight percent, preferably 0 to 10% weight percent. The equipment used to determine relative humidity (vapor pressure) developed by the coatings of this invention is an air tight plastic desiccant box measuring 8½"×6" to provide a sealed environment. This box is equipped with a temperature and relative humidity measurement device (General Eastern Model 850 transmitter) which is interfaced with a Hewlett Packard Data Collection system. The apparatus is placed in a 70° F./60% relative humidity environment, to provide controlled starting headspace conditions inside the sealed box. The procedure for relative humidity determination includes one hundred grams of a coating to be tested which is spread evenly onto the surface of a disposable aluminum pan, having slightly less dimensions as the bottom of the desiccator box (8"×10"). Humidity measurements are recorded at five minute intervals over the time needed to substantially equilibrate the headspace relative humidity for a period of time not exceeding two hours. The term "aqueous soluble sugar-containing syrup" means that the soluble mono- and disaccharide sugars used in the syrup are dissolved with a minimum amount of water. If excess water is used to produce the syrup, it could effect the relative humidity the coating exceeding the 75% relative humidity of where an effective coating for the fried bakery products may not be achieved. The use of the relative humidity of the coating to achieve success of an outstanding moisture control for a fried bakery product is unique and novel.

The aqueous soluble-containing sugar syrup can contain up to 92% solids, preferably between about 50 to about 80% total solids. The preferred sugar syrup to be used is defined as 42 LEVUDEX containing 30% fructose and 35% dextrose having 28% water with a total solids of 72%. Invert amount of water in the above described syrup can range from about 21 to about 30 weight percent.

A preferred coating of this invention contains edible fibrous-containing powder which acts as water binders. These include fibrous powder which are soluble or insoluble fibers such as coca, citrus peel, refined corn bran, citrus pectin, citrus albedo and the like. The cocoa powder used can contain about 1 to about 32 weight percent cocoa butter fat preferably about 10 to about 12 weight percent butter fat. The average particle sizes of the fibrous powder can range from about 35 to about 170 microns. The amounts of edible fibrous-containing powder can range from about 5 to about 15% weight percent of the coating composition.

The donuts which are coated by the use of the coating of this invention provide a moisture barrier which significantly reduces the deterioration of the product over extended periods of time. Chocolate coated and icing coated donuts have accelerated loss of moisture by the crumb and stale faster than any other type of donuts. The coating of the donut using the coating compositions of this invention provides a method to retard moisture migration and staling of the crumb by placing this interfacial layer between the crumb and the chocolate or icing coating. The interfacial coatings in the donuts of this invention allows the reduction of firmness development in the crumb, improved quality and prolong shelf life of chocolate coated or other icing coated donuts without deterioration in the appearance of the coating. What has been achieved is the substantial increase in the shelf life of the donut from 2.5 days without the interfacial coating of this invention to 5.5 to 7.5 days due to the carefully designed interfacial layer between the crumb and coatings. The staling of the product is significantly retarded using the interfacial coating of this invention.

The coatings of this invention are prepared by placing the edible lipids into a mixing bowl, blending the free water with the aqueous soluble sugar syrup and mixing the blend with the fat and shortening to provide a smooth and creamy product. Then heating the mixture to 120° F. to about 140°F. If an edible fibrous-containing powder such as cocoa is used, it is combined with portions of the edible lipids prior to the addition of mixing with the aqueous soluble sugar syrup.

The coating is heated or maintained at temperatures of 115° F. to about 140° F. and applied to the surface of the hot donut made by a normal frying process. After the coating has set up, the chocolate or icing top coating can be applied. Both of these coatings may be applied to the surface of the product by any practical mechanical means such as dipping, spraying, brushing or a water fall. It is important to remove the excess of the coating to provide a substantially uniform coating by any practical means such as air blowdown, mechanical vibration or centrifuging while at the same time minimizing external markings due to the support of the donut during drying or setting of the donut. The amount of interfacial coating can range from about 10 to about 25 weight percent of the donut, preferably about 14 to about 22 weight percent. The top chocolate or icing coating may range from about 25 to about 35 weight percent of the donut, preferably about 29 to about 33 weight percent.

The following examples further illustrate the invention.

EXAMPLES 1–9

Preparation Of Interfacial Coating

EXAMPLE 1

Into a Hobart type mixing bowl, 73.7 pounds of a mixture of soybean oil-cottenseed oil emulsified with mono and diglycerides having a melting point of 115° F. was blended at low speed with 28 pounds of cocoa powder containing 10 to 12 weight percent cocoa butter fat. 73.7 pounds additionally of a mixture of soybean-cottonseed oil as described above was added to the blended cocoa-cottonseed oil-soybean oil mixture and blended until uniform. Separately 4.6 pounds of water was thoroughly mixed with 20 pounds of 42 LEVUDEX containing 30% fructose and 36% dextrose (total solids 72%) containing 28% bound water to produce the syrup. This mixture was added to the cocoa-cottonseed oil-soybean oil mixture and blended to a smooth and creamy texture. The relative humidity of this coating as measured in the relative humidity apparatus, previously described, was 65%.

The coating composition was placed in a water-fall coating unit used for glazing donuts. The temperature of the coating was maintained at 130° F. during the coating. 8 grams of a substantially uniform coating was applied to the entire surface of the donut. In a similar manner a chocolate coating was applied to the entire surface of the donut.

EXAMPLE 2

In a similar manner as in Example 1 except no cocoa was blended in the mixture. The relative humidity of the coating was 73%.

The following table summarizes the various coating compositions and chocolate coated donuts in additional examples 3 through 9 utilizing a similar process as described in Example 1.

TABLE

| | Type of Interface Coating | | | Interface Coating | | Chocolate Coated | |
| --- | --- | --- | --- | --- | --- | --- | --- |
| | Cottonseed Oil Soybean Oil Mixture | Cocoa | Aqueous Soluble* Sugar Syrup | | Relative | | |
| Example | % | % | % | Moisture % | Humidity % | Shelf Life Days | Stickiness |
| Example 1 | 73.7 | 14 | 10 | 4.3 | 65 | 5.5 | Low |
| Example 2 | 87.7 | 0 | 10 | 5.3 | 73 | 5.5 | Low |
| Example 3 (Control) | 0 | 0 | 0 | 0 | 38 | 2.5 | Low |
| Example 4 | 81.0 | 14 | 5 | 1.2 | 41 | 5.5 | Very sticky |
| Example 5 | 79.4 | 14 | 5 | 3.2 | 64 | 7.5 | Sticky (acceptable) |
| Example 6 | 76.0 | 14 | 10 | 2.3 | 64 | 5.5 | Medium |
| Example 7 | 66.0 | 14 | 20 | 4.6 | 70 | 4.5 | Sticky (acceptable) |
| Example 8 | 84.0 | 14 | 0 | 2.0 | 57 | 3.5 | Sticky (acceptable) |
| Example 9 | 93.6 | 0 | 0 | 26.9 | 83 | 3.5 | Low |

*42 LEVUDEX (HFCS) 30% F H$_2$O 36% D Total Solids T.S. = 72

In the above table, it should be noted that high shelf life and low or acceptable stickiness donuts are obtained when the interface coating relative humidity ranges from 64 to 73% and the moisture of the interface coating ranges from 3.2 to 5.3%.

What is claimed is:

1. A method of providing an improved bakery product which comprises:
   (a) covering a fried bakery product with a substantially uniform coating, said coating comprises:
      (1) about 60 to about 95 weight percent of an edible lipid having a melting point above about 99° F. and
      (2) an amount of aqueous soluble sugar-containing syrup and water or water alone added to ingredient (1) to produce a moisture content in the coating composition having a relative humidity from about 73 to about 75% as measured in a sealed air-tight box having a controlled starting headspace of 70° F./60% relative humidity environment of 100 grams of said coating spread evenly onto a surface of a pan recorded at five minute intervals until the substantially equilibrated relative humidity is obtained; and
   (b) coating the product of (a) with a substantially uniform coating of icing.

2. The method of claim 1 wherein the fried bakery product is a donut.

3. The method of claim 1 wherein the fried bakery product is a donut and the icing is chocolate.

4. The method of claim 1 wherein the coating is:
   (1) an edible lipid having a melting point above about 99° F. is present in amounts of about 65 to about 88 weight percent; and
   (2) an edible fibrous-containing powder present in amounts from about 5 to about 15 weight percent.

5. The method of claim 4 wherein the fried bakery product is a donut.

6. The method of claim 4 wherein the fried bakery product is a donut and the icing is chocolate.

7. The method of claim 1 wherein the edible lipid is a mixture of cottonseed oil-soybean oil having a melting point of at least 115° F. and the aqueous soluble sugar-containing syrup having up to about 92% solids.

8. The method of claim 7 wherein the fried bakery product is a donut.

9. The method of claim 7 wherein the fried bakery product is a donut and the icing is chocolate.

10. The method of claim 4 wherein the coating is:
    (a) the edible lipid is a mixture of cotton seed-soybean oil emulsified with mono- and diglycerides, said oil having a melting point of at least 115° F.;
    (b) the edible fibrous-containing powder is cocoa containing 6–32 weight percent cocoa butter fat; and
    (c) the aqueous soluble sugar-containing syrup is a fructose corn syrup having up to about 92% solids.

11. The method of claim 10 wherein the fried bakery product is a donut.

12. The method of claim 10 wherein the fried bakery product is a donut and the icing is chocolate.

13. The method of claim 1 wherein the bakery product is a donut having a substantially uniform coating wherein the coating is:
    (a) the edible lipid of the coating is a mixture of cottonseed-soybean oil having a melting point of about 107° F.;
    (b) the aqueous soluble sugar-containing syrup having up to 92% total solids.

14. The method of claim 13 wherein the icing on said donut is chocolate.

15. The method of claim 4 wherein the bakery product is a donut and the coating is:
    (a) a lipid being a mixture of cottonseed oil-soybean oil emulsified with mono- and diglycerides, said oil having a melting point of 115° F.;
    (b) the edible fibrous-containing powder is cocoa containing 10 to 12 weight percent cocoa butter fat; and
    (c) the aqueous soluble sugar-containing syrup is a fructose corn syrup having up to 92% solids.

16. The method of claim 15 wherein the icing on said donut is chocolate.

UNITED STATES PATENT AND TRADEMARK OFFICE
CERTIFICATE OF CORRECTION

PATENT NO. : 5,028,442
DATED : July 2, 1991
INVENTOR(S) : Velery Zemelman, et al.

It is certified that error appears in the above-identified patent and that said Letters Patent is hereby corrected as shown below:

Column 1, line 16 delete the word "series" and substitute therefore serious.

Claim 1, column 5 line 46 delete the number "73" and substitute therefore 63.

Signed and Sealed this

Seventeenth Day of November, 1992

Attest:

DOUGLAS B. COMER

*Attesting Officer*  *Acting Commissioner of Patents and Trademarks*